Feb. 7, 1967   C. CHENDY ETAL   3,302,526
CUTTING TOOLS
Filed May 13, 1965

INVENTORS
Charles Chendy &
Kenneth L. King, Jr.
their attorneys

United States Patent Office 3,302,526
Patented Feb. 7, 1967

3,302,526
CUTTING TOOLS
Charles Chendy, Box 93, Wilpen, Pa. 15694, and Kenneth L. King., Jr., R.D. 3, Box 475B, Latrobe, Pa. 15650
Filed May 13, 1965, Ser. No. 455,538
3 Claims. (Cl. 90—12)

This invention relates to cutting tools and particularly to a portable end mill, spot facer and the like.

There are many situations where it is desirable to have a portable tool suitable for spot facing, end milling or otherwise preparing and spotting a surface. For example, in remaking tire molds for conversion to the new carbide insert tires, it is necessary to remove a portion of the vertical fins on the interior of the mold to provide a cylinder of rubber carrying the hole into which the carbide is inserted. This cannot be accomplished by any portable tool now known to the industry but only on an expensive stationary mill in which the mold must be jigged and set and rotated to each new position for the stainless steel post which forms the hole in the rubber for a carbide insert. This is a very time consuming and expensive task. By using the tool of our invention this identical job can be done with an electric hand drill at a fraction of the time and cost.

Preferably we provide an elongated hollow body adapted at one end to be attached to the drive shaft of an electric or air hand drill, an end mill in the opposite end of said body, said end mill having an axial passage therethrough communicating with the interior of the hollow body, a shaft rotatable and axially movable in said axial passage, said shaft extending beyond the end of the end mill member remote from the body and having a hardened point thereon, and spring means in the hollow body normally urging the shaft away from the hollow body. Preferably the spring and shaft are separated by a ball, a thrust bearing or the like connection permitted relative rotational movement between the spring and the shaft end. The shaft end within the body is preferably provided with a flat disc upon which the ball connection bears and which provides some frictional engagement with the body in the extended position while acting as a stop to hold the shaft within the end mill member.

Figure 1:
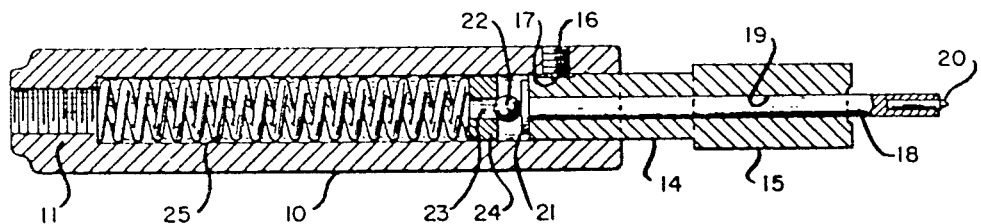
Figure 2:
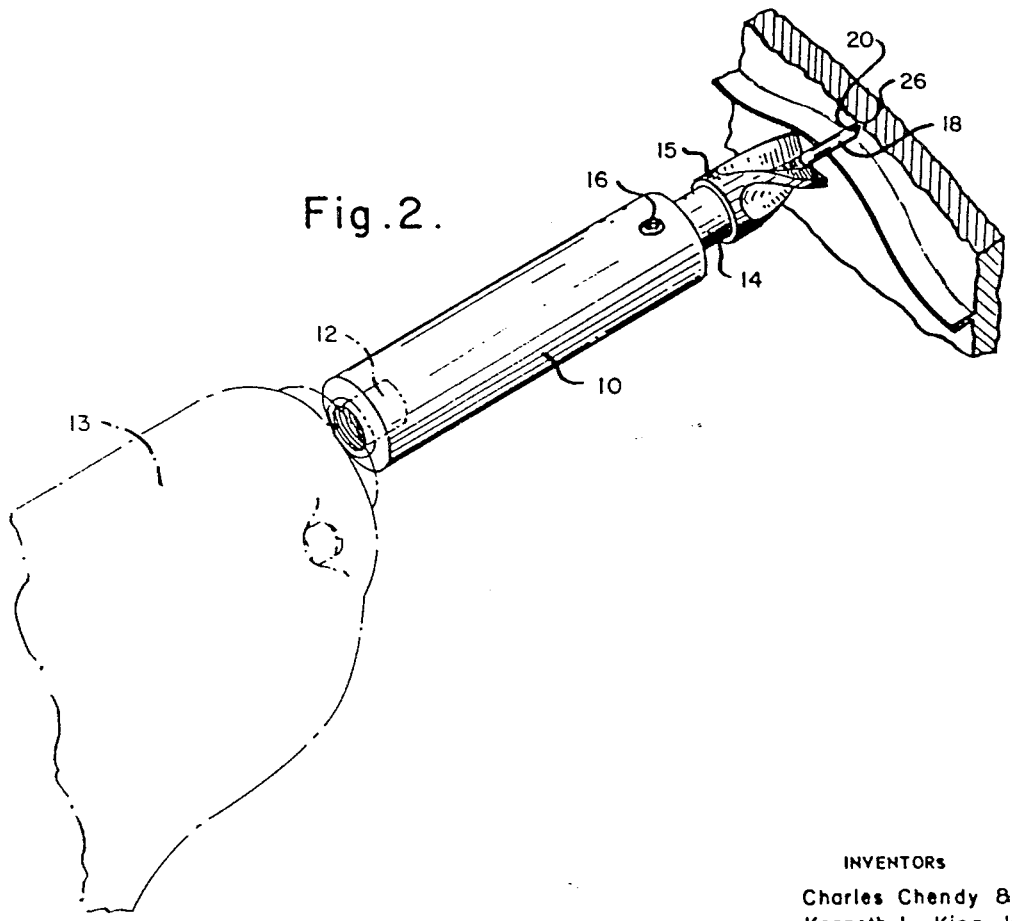

In the foregoing general description we have set out certain purposes, objects and advantages of our invention. Other objects, purposes and advantages will be apparent from a consideration of the following description and the accompanying drawings in which, FIGURE 1 is a longitudinal section of a cutting tool according to our invention; and FIGURE 2 is an isometric view of the cutting tool of FIGURE 1 mounted on a drill.

Referring to the drawings, we have illustrated a hollow cylindrical body 10 having a threaded head 11 at one end to receive the drive shaft 12 of a hand electric drill 13. The opposite end of body 10 is open to receive the shank 14 of end mill cutter 15. A lock screw 16 is threaded through the wall of body 10 to engage a flat 17 on the shank 14 to lock the shank in place in the body. An elongated shaft 18 is freely slidable and rotatable in axial passage 19 in cutter 15. One end of shaft 18 which extends out of the passage 19 is provided with a pointed carbide tip 20. The opposite end of shaft 18 is provided with a flat disc head 21 which rests on the end of shank 14. A ball 22 rests on head 21 and is centered in a recess 23 in follower 24 sliding with the interior of the hollow body. A spring 25 bears at one end on the head 11 and at the other end on follower 24 to urge the shaft 18 outwardly of body 10.

The operation of the cutter is as follows. The point 20 is placed at the center 26 of the area to be surfaced, the drill is energized and the body 10 is thereby rotated. This causes cutter 15 to rotate and carry with it shaft 18 by reason of frictional engagement. As pressure is applied on the head 11 of body 10, the point 20 forms a slight depression in the work and the spring 25 is compressed, the cutter 15 moves down along shaft 18. Shaft 18 acts to maintain the cutter 15 on center and provides a guide which makes possible the milling of a fixed selected area without the need for a heavy fixed shaft and head to carry the cutter. This permits very precise surfacing, point facing and point milling even in the presence of surface irregularities, density differences, differences in hardness, composition or the like which could not be done with any portable tool known to us. With the device of this invention we are able to accomplish work with a hand drill which heretofore required an expensive and heavy duty fixed machine with quite limited flexibility.

In the foregoing specification we have set out certain preferred embodiments and practices of our invention. It will be understood, however, that this invention may be otherwise embodied within the scope of the following claims.

We claim:

1. A cutting tool comprising an elongated hollow body adapted for rotation by a prime mover, end mill means in one end of said body, an axial passage in said end mill means communicating with the interior of the hollow body, a shaft rotatable and axially movable in said passage, said shaft extending beyond said end mill means and having a point thereon, spring means in the hollow body normally urging the shaft outwardly through the passage and antifriction bearing means between the shaft and said spring.

2. A cutting tool comprising an elongated hollow body adapted for rotation by a prime mover, end mill means in one end of said body, an axial passage in said end mill means communicating with the interior of the hollow body, a shaft rotatable and axially movable in said passage, said shaft extending beyond said end mill means and having a point thereon, spring means in the hollow body normally urging the shaft outwardly through the passage and ball means connecting said shaft and said spring and said body.

3. A cutting tool comprising an elongated hollow body adapted for rotation by a prime mover, end mill means in one end of said body, an axial passage in said end mill means communicating with the interior of the hollow body, a shaft rotatable and axially movable in said passage, said shaft extending beyond said end mill means and having a point thereon, said shaft being retractable into the interior of the body through said passage, stop means on the end of said shaft within the body, spring means in the hollow body bearing on said stop means normally urging the shaft outwardly through the passage and antifriction bearing means between said spring means and stop means.

References Cited by the Examiner
UNITED STATES PATENTS
2,665,599   1/1954   Roman _____ 77—73.5

OTHER REFERENCES
Publication: Railway Age Gazette, 1911, page 130.
Publication: American Machinist, October 12, 1916, page 628.

WILLIAM W. DYER, JR., Primary Examiner.
G. A. DOST, Assistant Examiner.